J. H. HOBBS.
MOLDS FOR PRESSING GLASS ATTACHMENTS TO METALLIC CHANDELIERS.

No. 182,073.          Patented Sept. 12, 1876.

WITNESSES
Jane E. Baggs
Claudius L. Parker

INVENTOR
John H. Hobbs
by George H. Christy
his atty

UNITED STATES PATENT OFFICE.

JOHN H. HOBBS, OF WHEELING, WEST VIRGINIA.

IMPROVEMENT IN MOLDS FOR PRESSING GLASS ATTACHMENTS TO METALLIC CHANDELIERS.

Specification forming part of Letters Patent No. 182,073, dated September 12, 1876; application filed April 16, 1875.

*To all whom it may concern:*

Be it known that I, JOHN H. HOBBS, of Wheeling, county of Ohio, State of West Virginia, have invented or discovered a new and useful Improvement in Manufacture of Pressed-Glass Mountings; and I do hereby declare the following to be a full, clear, concise, and exact description thereof, reference being had to the accompanying drawing, making a part of this specification, in which—like letters indicating like parts—

Figure 1:
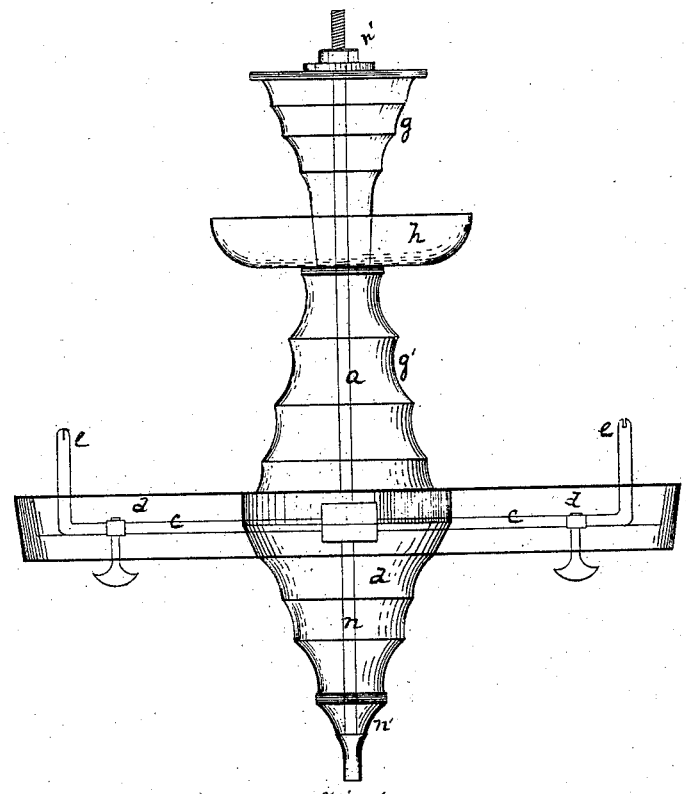
Figure 2:
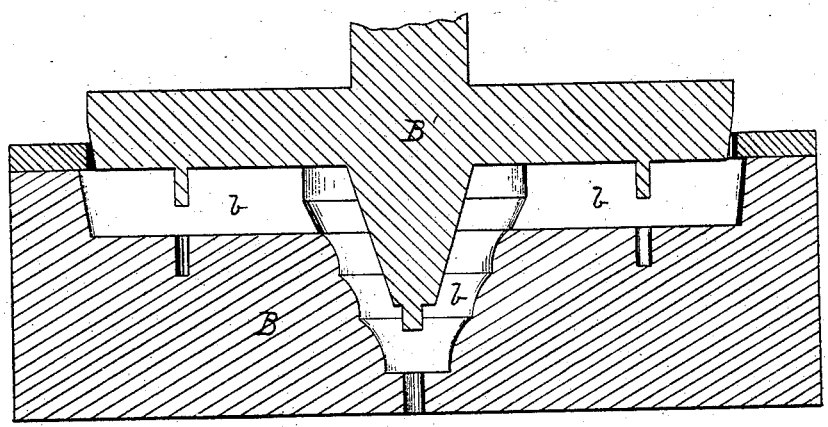

Figure 1 is a side elevation of a glass-mounted chandelier, and Fig. 2 is a sectional view of my improved mold and plunger, illustrative of the mode of manufacture employed.

Heretofore gas chandeliers, brackets, and like articles have been made wholly of metal, or of glass blown and worked by heat and hand manipulation to the desired form. This latter mode of manufacture is slow, tedious, and exceedingly expensive, and the gas, passing through glass tubes, either by condensation or from the presence of impurities, is apt to discolor the inside of the glass tube, thereby giving the chandelier or bracket an unsightly and disagreeable appearance. By my improvement I combine with the ordinary metallic tubes or conductors a pressed-glass case or trimming, such as will, in the finished product, give the pleasing effect of the blown-glass article, and be free from all liability to discoloration by impurities in the gas, without materially, if at all, increasing the cost over that of the metallic article heretofore made.

The gas-conductors in the chandelier shown in the drawing are made with the usual metal or metallic pipe or tubing in the shaft $a$ and brackets or arms $c$, including the burners $e$. These parts, except the burner, have heretofore been cased in or covered by metallic cases or trimmings of various patterns or designs, sometimes of sheet metal stamped to shape, but more commonly of cast metal, molded and cast in the usual way. In my improvement I make these pipe and tubing cases or trimmings of pressed glass, molded and pressed in sections, one form of mold for such purposes being shown in Fig. 2, where B is a sectional view of a mold, and B' the plunger, each with operative faces, such as to give a mold-cavity, $b$, of the form of the trimming $d$ to be made.

The chief peculiarity of this mold consists in the fact that it has a central cavity and plunger for pressing the lower part of the center piece and radial cavities leading therefrom and communicating therewith, into which the glass is forced, and in which it is pressed so as to make the trimming $d$ in one piece, and with radial arms corresponding to the number of radial arms in the chandelier, whereby each bracket-arm $c$ has its proper trimming or mounting.

As a modification of the device shown, the radial cavities may be closed on top like a mold, and the central part of the plunger alone be employed to force out the molten glass and shape it against inclosing-walls so formed.

The molten glass is dropped in, and the pressing is done in the usual way. In this manner the trimmings $d$ are produced in sections of the pattern desired, and these are then arranged on the metallic gas-conductors, and secured in place by a stem, $n$, and nut $n'$. The other parts or sections of trimming $g$ $g'$ $h$, &c., are made of glass, by pressing in like manner, and are slipped onto the shaft $a$; but in attaching such trimmings to the chandelier or bracket any known suitable fastening device may be employed, and such trimmings may in like manner be applied to lamp brackets and chandeliers with like useful results.

When transparent glass is employed in the manufacture described the metallic gas-conductors should be bronzed, silvered, or otherwise plated or coated, so as to prevent or conceal oxidation; but when colored or non-transparent glass is used this will be in most cases unnecessary, and different colors may be employed in different chandeliers or brackets, or in the different sections of the same, so as to add still more to the ornamental character of the product.

In order to illustrate fully the present invention I have shown and in part described the article produced, and the manner of making the same; but in the present application I claim only the mold and plunger, as hereinafter stated. The other features of invention, and particularly the article or articles produced and illustrated in Fig. 1, are or will be claimed in other applications.

What I claim as my invention, and desire to secure by Letters Patent, is—

A mold for pressing glass attachments for metallic chandeliers, having a central cavity for the pressing of a center-piece or a part thereof, and radial cavities communicating therewith for the pressing of bracket-trimmings thereon, so as to form a part thereof, in combination with a plunger, which shall both shape the center-piece, and also force the glass outwardly into the radial cavities, substantially as set forth.

In testimony whereof I have hereunto set my hand.

JOHN H. HOBBS.

Witnesses:
 B. M. HILDRETH,
 LUCIEN B. MARTIN.